US009503444B2

(12) United States Patent
Adderly et al.

(10) Patent No.: US 9,503,444 B2
(45) Date of Patent: Nov. 22, 2016

(54) SYSTEM AND METHOD FOR SHARING ACCESS TO A SERVICE WITHIN A HOME NETWORK

(71) Applicant: International Business Machines Corporation, Armonk, NY (US)

(72) Inventors: Darryl M. Adderly, Morrisville, NC (US); Jonathan W. Jackson, Durham, NC (US); Ajit J. Jariwala, Cary, NC (US); Eric B. Libow, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/627,562

(22) Filed: Feb. 20, 2015

(65) Prior Publication Data

US 2016/0248744 A1 Aug. 25, 2016

(51) Int. Cl.
*H04L 29/06* (2006.01)
*G06F 7/04* (2006.01)
*G06F 15/16* (2006.01)
*G06F 17/30* (2006.01)

(52) U.S. Cl.
CPC .............. *H04L 63/08* (2013.01); *H04L 63/02* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 8,977,856 | B2* | 3/2015 | Malek ................. | H04L 63/0815 713/171 |
| 9,172,699 | B1* | 10/2015 | Vazquez ............ | H04L 63/0861 |
| 2004/0003081 | A1* | 1/2004 | Justus ................. | H04L 63/0815 709/225 |
| 2007/0237093 | A1* | 10/2007 | Rajagopalan ......... | H04L 63/102 370/254 |
| 2009/0217367 | A1* | 8/2009 | Norman .............. | H04L 63/0815 726/8 |
| 2013/0080520 | A1* | 3/2013 | Kiukkonen ............ | G06Q 50/01 709/204 |
| 2013/0086651 | A1 | 4/2013 | Kavantzas et al. | |
| 2013/0086652 | A1 | 4/2013 | Kavantzas et al. | |
| 2014/0165165 | A1* | 6/2014 | Story, Jr. ............... | H04W 12/04 726/6 |
| 2014/0188921 | A1 | 7/2014 | Thomason et al. | |
| 2014/0189840 | A1* | 7/2014 | Metke .................... | G06F 21/41 726/9 |
| 2014/0254546 | A1 | 9/2014 | L'Heureux et al. | |
| 2014/0258441 | A1* | 9/2014 | L'Heureux ........... | H04W 12/06 709/217 |
| 2014/0259147 | A1 | 9/2014 | L'Heureux et al. | |
| 2014/0317702 | A1* | 10/2014 | Hughes .................. | H04L 67/32 726/6 |

OTHER PUBLICATIONS

Magento, Persistent Shopping Cart—Customer Segmentation Just Getting Better, Feb. 4, 2015.
Magento Go, Setting Up a Persistent Shopping Cart, Feb. 4, 2015.
A. Leinonen, VTT Research Notes 2596, Identity Management for Web-Enabled Smart Card Platform, 2011.

* cited by examiner

*Primary Examiner* — Shin-Hon Chen
(74) *Attorney, Agent, or Firm* — Terrile, Cannatti, Chambers & Holland, LLP; Michael Rocco Cannatti

(57) ABSTRACT

A home network router and method of operation are provided for seamlessly sharing access to a network service by multiple devices in a home network by configuring the home network router to receive and store authenticated user credentials for the network service at the home network router after associating the user credentials with the network service so that, upon reception of a second user request from a second client device to access the network service, the user credentials are retrieved from the home network router for direct delivery to and authentication by the network service without requiring re-entry of the one or more user credentials from the second client device.

12 Claims, 3 Drawing Sheets

SYSTEM AND METHOD FOR SHARING ACCESS TO A SERVICE WITHIN A HOME NETWORK

BACKGROUND OF THE INVENTION

Home routers providing wired and/or wireless local area network (LAN) access to client devices in the home environment are typically connected to a wide area network (WAN), such as the Internet, which provides high capacity wired or wireless communications links to web service operations which may be accessed by a client device connected to the LAN, provided that the user credentials associated with each request is authenticated by the web service. However, user attempts to access a web service from different client devices connected to the LAN will typically require that the user recall their credentials and login again from each client device. This becomes especially problematic in a multi-device, multi-platform, multi-user environment with logins having to be done for each access method for the web service the user wants to access. While solutions have been proposed for synchronizing bookmarks, settings, and credentials for a particular browser across devices and ecosystems, such solutions typically require that the same application (e.g., Chrome) is used across all devices for a particular service. There have been other attempts to synchronize web service access requests from multiple users or devices, but such approaches have required server-side solutions at the web service, heavy weight session data resource management between client devices, and/or distributed storage of credentials at the client devices. As a result, the existing solutions for efficiently synchronizing authorized user actions across a variety of access points for the same service are extremely difficult at a practical level.

SUMMARY

Broadly speaking, selected embodiments of the present disclosure provide a system, method, and apparatus for synchronizing the user experience in accessing a service across multiple devices by storing service credentials of a first authenticated user at the home network router for shared use with subsequent access requests to the service by the other devices, platforms and portals at the home network. The home network router may be embodied as an information handling system which includes persistent credential storage for storing and sharing service credentials to enable different devices and/or browsers at the home network to seamlessly share access to a network service. By storing service credentials at the home network router, a user who starts interacting with a service on a first device (e.g., an iPhone) can pick up where the user left off on another device (e.g., an Android tablet, Windows laptop, iMac, etc.), regardless of the access method (i.e., mobile application, browser, etc.) used on the second device. In addition to storing service credentials, the home network router may include router firmware, such as DD-WRT (a Linux-based firmware for wireless routers and access points), with an integrated custom service that is configured to facilitate an initial authentication exchange with a service, collect credentials from the user being authenticated, request permission from the user to store the credentials at the home network router, and then check the stored credentials for the user whenever the service is re-accessed from home to avoid requiring credential reentry. To address scenarios where there are multiple users on the same service, each user may be prompted to choose between entities recognized by the home network router.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
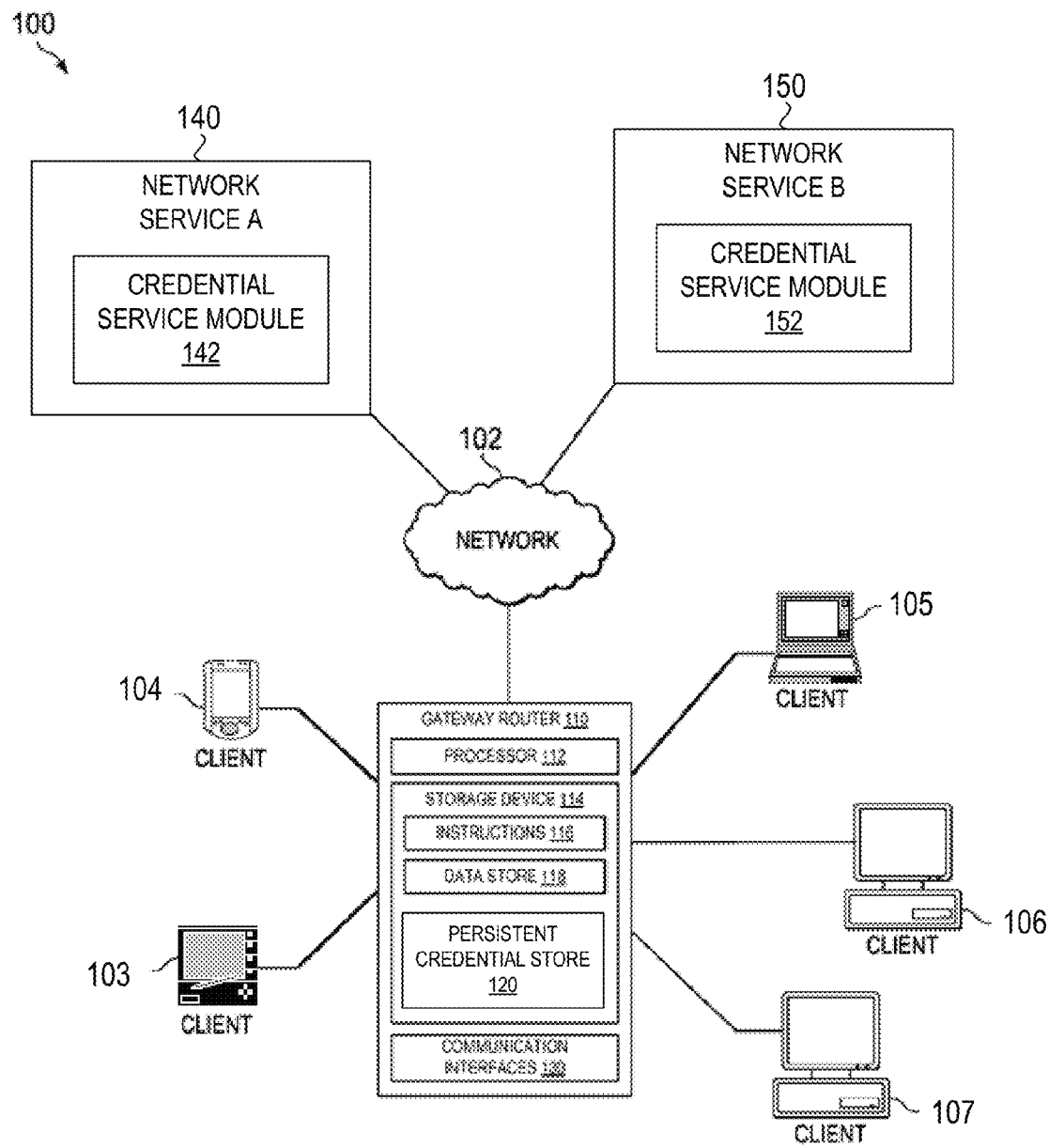
FIG. 1 depicts a schematic diagram of a data processing system with a home network gateway router for using stored credentials to synchronize user access to a web service in accordance with selected embodiments of the present disclosure.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains a home network in which a plurality of client devices 103-107 are connected across a gateway router server 110 to the network 102 which is the medium used to provide communication links between various devices and computers connected together within distributed data processing system 100. The distributed data processing system 100 may also include one or more server computers 140, 150 which are connected to provide web service applications Network Service A, Network Service for access by the client devices 103-107. Each server computer 140, 150 can be embodied in one or more general purpose computers, specialized server computers (including, e.g., PC servers, UNIX servers, mid-range servers, mainframe computers, rack-mounted servers, etc.), server farms, server clusters, or any other appropriate arrangement and/or combination. Each server computer 140, 150 can run a web service application Network Service A, Network Service B on a commercially available operating system along with any of a variety of server applications and/or mid-tier applications, including web servers, FTP servers, CGI servers, Java virtual machines, and the like. For example, each server computer 140, 150 may include a credential service module 142, 152 for authorizing access to its network service by authenticating the credential and user profile information provided by each client device which requests access to the network service. With the credential service module (e.g., 142), device and/or user credentials and/or identities (e.g., profiles) can be managed to provide credential-based access or functionality available to client devices and/or users. In this way, each server computer 140, 150 may provide authorized access to the network service to the client devices 103-107. Distributed data processing system 100 may include additional servers, clients, and other devices not shown.

In the distributed data processing system 100, the client devices 103-107 may take the form of a personal computer, mobile computing device, mobile communications device (e.g., Internet enabled phone), television set-top box, or other suitable electronic device. For example, the client devices may include, for example, a tablet computer 103, a hand-held computer or mobile phone 104, a laptop computer 105, a Windows-based personal computer 106, a Mac personal computer 107, or any other type of networked computer or machine. Each client device may include a processor to execute instructions stored on the client device as software and/or firmware. Such instructions may form an operating system of client device, an application program, a software component such as a plug-in, or other suitable instruction set, or combination thereof. In selected embodiments, the client device instructions may be configured to operate in coordination with instructions stored and executed at the gateway router 110 to facilitate access over the network 102 to a network service (e.g., 140). As one example, client device 103 may take the form of a smart mobile computing device that further supports wireless connectivity to the gateway router 110. As a another example, client device 104 may take the form of a smart mobile communications device (e.g., an Internet enabled phone) that further supports wireless connectivity to the gateway router 110 via a mobile broadband technology such as, for example, 3G or 4G.

The network 102 may include connections, such as wire, wireless communication links, or fiber optic cables. In an example embodiment where the distributed data processing system 100 is the Internet, the network 102 may represent a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As will be appreciate, the distributed data processing system 100 is provided as an example, not as an architectural limitation, for different embodiments of the disclosed subject matter, and therefore, the particular elements shown in FIG. 1 should not be considered limiting with regard to the environments in which the illustrative embodiments of the present invention may be implemented.

To facilitate communication over the network 102, a gateway router 110 is provided to support shared access to a remote network service among client devices 103-107 of the home network by using stored credentials to synchronize user access to the remote web service. To this end, the gateway router 110 is positioned along a communications path between the wide area network (WAN) 102 and a local area network (LAN) of client devices 103-107 defining a home network. Thus, the gateway router 110 may be implemented as on-premises equipment to provide LAN access to homes, residences, businesses, or other suitable LAN use environments, and may take the form of a private gateway or access point that is owned and/or operated by an owner or operator of the home, residence, business, or use environment in which the gateway router is deployed, in contrast to some public or business network routers. In this position, the gateway router 110 may capture and store service credentials for a network service from a user at a first client device to enable the user access the network service from second client device without re-entering the credentials. In a storage device 114 of the gateway router 110, captured credentials from a first user/client device (e.g., 103) are stored at a persistent credential store 132 to enable subsequent access to the associated network service by other client devices (e.g., 104-107).

As depicted, the gateway router 110 may include a processor 112, storage device 114, and communications interface 130. The processor 112 is connected to retrieve and store data 118 and to execute instructions 116 stored in the storage device 114 which may include or take the form of non-volatile memory (such as a hard drive, flash memory device, or other suitable non-volatile memory) and/or volatile memory which may be used to store instructions 116 and data 118. The instructions 116 may be stored in the storage device 114 as software and/or firmware to form part of an operating system of gateway router 110, an application program, a software component such as a plug-in, or other suitable instruction set, or combination thereof. In selected embodiments, the gateway router instructions 116 may be configured to operate in coordination with associated or paired client device instructions (e.g., software or firmware) and/or instructions (e.g., software or firmware) executed at a network server computer 140 to facilitate access over the network 102 to a network service (e.g., Network Service A). In support of such functionality, the storage device 114 of gateway router 110 may also include a data store 128 for data storage and/or retrieval. The storage device 114 may also include a persistent credential store 120 for storing service credential information that is used to authenticate a client device when accessing a network service. As described in greater detail hereinbelow, the persistent credential store 120 may store authentication-related credentials provided upon initial validation of the user identification and login password by network service. For example, the user's service credentials may be stored along with information identifying the corresponding website/application in the persistent credential store 120 of the home gateway router 110 in an encrypted file, such as by creating, for each user, a folder for each website/application in which the service credential is stored as an encrypted file or cookie.

The processor 112 is also connected to the communication interface 130 which supports wired and/or wireless communications between the home network client devices 103-107 and the network service devices 140, 150 using one or more wired and/or wireless transceivers, modems, or other suitable electronic devices to facilitate communications between computing devices. Using the communication interface 130, the gateway router 110 may support Internet communications over the WAN 102 and wired and/or wireless communications between gateway router 110 and client devices 103-107 through any suitable communication protocol, including but not limited to Wi-Fi (e.g., 802.11), Wi-MAX (e.g., 802.16), LTE (e.g., 3GPP TS 36), UMTS (e.g., 3GPP TS 25), CDMA, Bluetooth, or the like.

By executing stored instructions 116 and data 118 at the processor 112, the gateway router 110 may establish communication sessions with LAN client devices 103-107 by routing communications between these client devices and the network service devices 140, 150. For example, a first client device (e.g., 103) may connect to a home wireless access network by establishing a communication link to the gateway router 110 and opening a first web browser (e.g., Internet Explorer) to navigate to a website server 140 which requires authentication of the user before providing a network service (e.g., "Network Service A"). At the website server 140, the credential service module 142 interacts with the first client device 103 to authenticate the user's credentials, such as by requiring entry of the user's userid and password information. Upon receipt of messaging information from the website server 140 indicating that the user is authenticated, instructions 116 and data 118 are executed at the processor 112 to present a message prompt to the first client device 103 to ask if the user would like to store credentials in the home network to avoid having to re-enter the credentials when accessing the site on another browser or device at home network. In selected embodiments, the message prompt may include option buttons, such as "Yes," "No," "Do Not Ask Again," and "Maybe Later." In the event that the user selects "Yes," the service credentials for the accessed network service (e.g., "Network Service A") are stored in the persistent credential store 120 so that any subsequent connection to the same network service (e.g., "Network Service A") by a different client device (e.g., 107) is directly logged in without requiring re-entry of credentials by the user at the second device, even the second client device uses a different web browser (e.g., Mozilla Firefox) to navigate to the network service 140. Once the user on one device (e.g., 103) in the home network accepts credential storage for a network service, the stored service credentials may be used to authenticate through all portals and applications on the other client devices 104-107 that browse the same network service. This includes authenticating to an iPhone application, Android application, and websites on both Safari (iMac) and Chrome on a Windows laptop. To address scenarios where a home network includes multiple users on the same network service, the instructions 116 and data 118 executed at the processor 112 may be configured to present an additional message prompt for the user to choose which of the plurality of identities the gateway router 110 recognizes.

Figure 2:
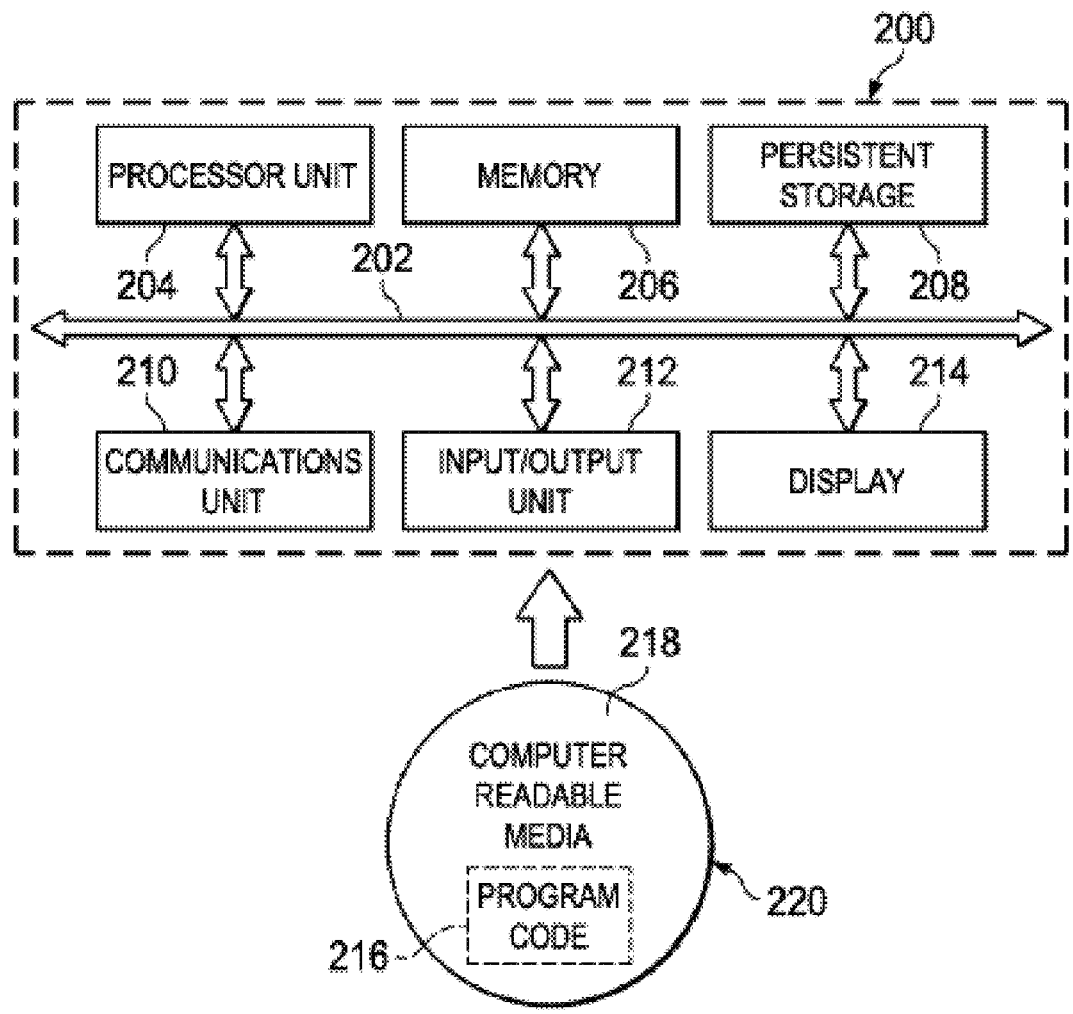
FIG. 2 is a block diagram of a processor and components of an information handling system in which exemplary aspects of the illustrative embodiments may be implemented.

With reference now to FIG. 2, there is shown a block diagram of a data processing system in which illustrative embodiments may be implemented. Data processing system 200 is an example of a computer, such as any of the client devices 103-107 or gateway router 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation, and may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. When embodying a home network router, either of both of the memory 206 and persistent storage 208 may store the service credentials and associated firmware and/or software which are used to synchronize and authenticate access to a selected network service from any portal and application accessing the network service from client devices connected through the home network router. Further, a memory may be, for example, a cache such as found in an interface and memory controller hub that may be present in communications fabric 202.

In selected embodiments, a bus system may be used to implement communications fabric 202 and may be comprised of one or more buses, such as a system bus or an input/output bus. As will be appreciated, the bus system may be implemented using any suitable type of architecture that provides for a transfer of data between different components or devices attached to the bus system.

Communications unit 210, in these examples, provides for communications with other data processing systems or devices. In these examples, communications unit 210 is a network interface card. Communications unit 210 may provide communications through the use of either or both physical and wireless communications links. Additionally, the communications unit 210 may include one or more devices used to transmit and receive data, such as a modem or a network adapter.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable. Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

As will be appreciated, the hardware shown in FIGS. 1-2 may vary depending on the implementation so that other internal hardware or peripheral devices, such as flash memory, equivalent non-volatile memory, or optical disk drives and the like, may be used in addition to or in place of the depicted hardware. Also, the processes of the illustrative embodiments may be applied to a multiprocessor data processing system without departing from the spirit and scope of the disclosed subject matter. In addition, the techniques described herein may operate in conjunction within any desired client-server paradigm, such as illustrated in FIG. 1 where client machines (e.g., smart phone 104) communicate with an Internet-accessible Web-based portal (e.g., network service device 140) executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
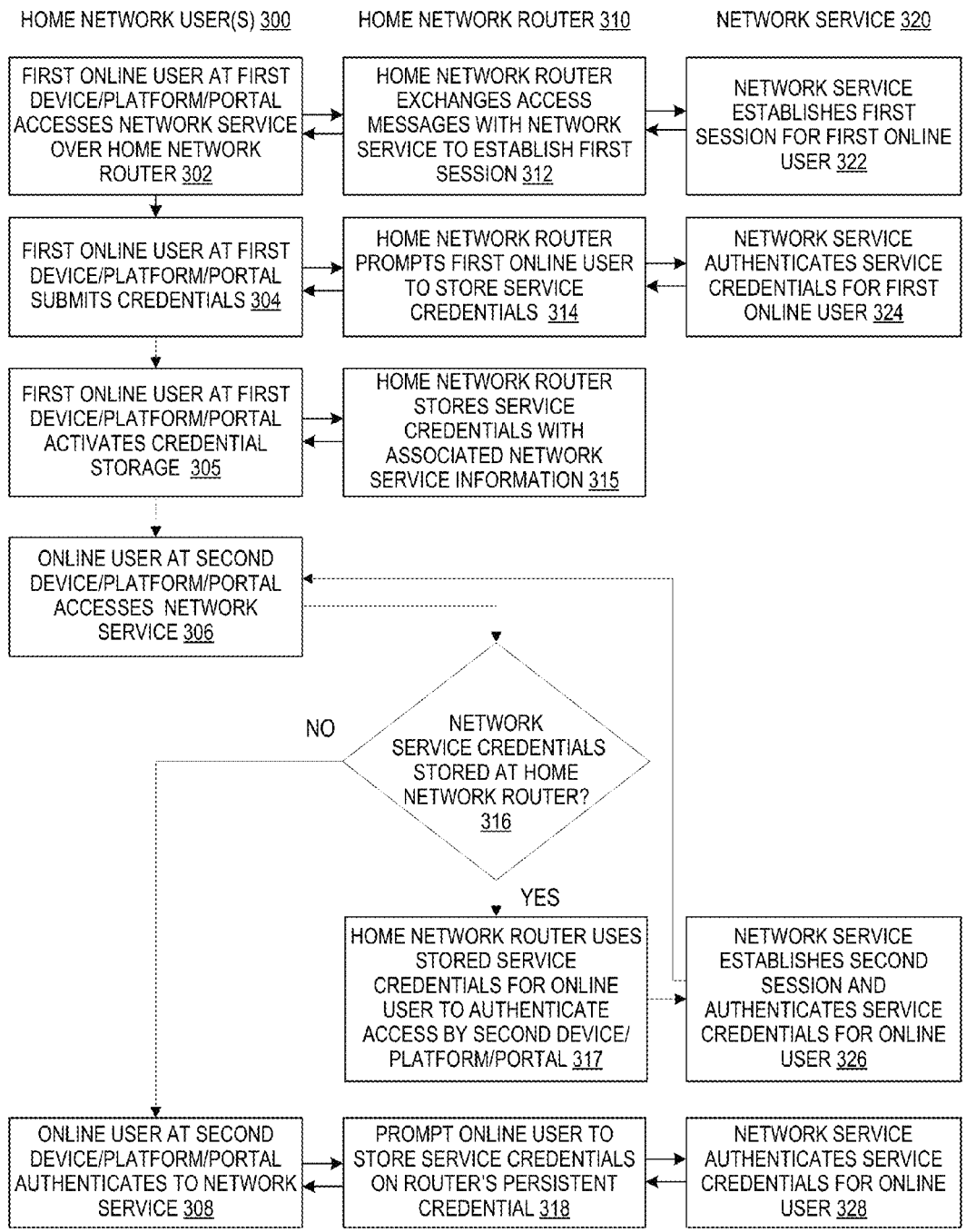
FIG. 3 illustrates a simplified flow chart showing the logic and processing steps for using credentials stored at a home router to synchronize network service access by multiple devices, platforms, and portals associated with the home network.

To provide additional details for an improved understanding of selected embodiments of the present disclosure, reference is now made to FIG. 3 which depicts a simplified flow chart showing the logic and processing steps for using credentials stored at a home router to synchronize network service access by multiple devices, platforms, and portals associated with the home network. The processing and logic shown in FIG. 3 is distribute across one or more home network users 300, a home network router 310, and a remote network service 320, each of which may be embodied with a data processing system 200 such as shown in FIG. 2. At step 302, the process commences when a first online user connects a first client device 300 (e.g., a personal computer) to the home wireless access network 310, where the connection is made from a platform (e.g., Windows OS) at the first client device 300 which communicates with the home network router 310. Through the connection with the home network router 310, the first online user 300 accesses a remote network service 320 by exchanging access messages across the home network router 310 to establish a first session with the network service at step 312. In an example scenario, the first session may be established by opening a portal (e.g., Internet Explorer browser) at the first client device 300 and navigating to a website system 320 which hosts the desired network service.

At step 304, the first online user at the first client device 300 accesses the desired network service 320 by registering, logging in, or otherwise sending credentials to authenticate the first online user to the desired network service 320. Through the connection with the home network router 310, the first online user 300 may be authenticated, such as by sending login and password data to the remote network service 320 for processing. At step 324, the user credentials entered by the first online user through the platform/portal at the first client device are evaluated by the network service, though the specific authentication procedures and mechanisms may vary from one system to the next.

Upon validation of the first online user's credentials, the home network router 310 receives messaging information from the network service 320 (or from the first client device 300) indicating that the first online user is authenticated. In response, the home network router 310 presents a message prompt to the first client device 300 at step 314 to ask if the first online user would like to store credentials in the home network router 310 to avoid having to re-enter the credentials when accessing the network service site 320 from any device, portal, or platform at the home network. In an example scenario, the message prompt generated at step 314 is presented on the first client device 300 as a pop-up message which includes response option buttons, such as "Yes," "No," "Do Not Ask Again," and "Maybe Later." The message prompt functionality may be embodied in the home network router 310 as software or firmware, such as DD-WRT (a Linux-based firmware for wireless routers and access points), with an integrated custom service that is configured to facilitate an initial authentication exchange with a network service, to collect credentials from the user being authenticated, and to request permission from the user to store the credentials at the home network router.

At step 305, the first online user selects "Yes" to activate the credential storage function, and the first client device 300 sends messaging information to the home network router 310 indicating that the service credentials for the accessed network service (e.g., "Network Service A") may be stored in the persistent credential store of the home network router 310 so that any subsequent connection to the same network service (e.g., "Network Service A") by a different client device, portal, or platform is directly logged in without requiring re-entry of credentials by the user at the second device/portal/platform. For example, the messaging information from step 305 may be sent by an application programming interface (API) at the first client device 300 which is activated to send an event notification to the home network router 310. The credential storage functionality may be embodied in the home network router 310 as software or firmware, such as DD-WRT, with an integrated custom service that is configured to collect and store authenticated credentials from the first online user.

As an enhanced security feature, the activation of the credential storage function at step 305 may be protected by requiring the user at the first client device 300 to enter a passphrase before being given access to the credential storage function. For example, the presentation of response option buttons to the first client device 300 at step 304 may optionally include a prompt for the first client device 300 to provide a separate, additional security passphrase for securely accessing the credential storage at the home network router 310, though this prompt may also be provided in a separate message. In such embodiments, the credential store passphrase may be distinct from the passphrase required to access the network 102 and from the passphrase or credentials provided to authenticate the first client device 300 to the network service. In selected embodiments where the user at the first client device 300 has not previously created a credential storage account with the home network router 310, the user would be prompted, upon activating the credential storage function at step 305, to register or create an account with home network router 310 whereby the first client device 300 creates a credential store access passphrase for accessing the credential storage at the home network router 310. However, where the user at the first client device 300 has already created an account with the home network router 310, the user would be prompted, upon activating the credential storage function at step 305, to enter the credential store access passphrase when the user chooses to store the credentials at the home network router 310. As will be appreciated, the credential store access passphrase requirement will protect the credential storage function when used in selected enterprise implementations.

In response to the event notification message, the home network router 310 stores service credentials with the associated network service information at step 315. The service credentials may be stored with associated network service information in the persistent credential storage of the home network router 310 on per-user basis. For example, a directory may be opened in memory for the first online user (e.g., "Mike"), along with a subdirectory for the accessed network service (e.g., "PayPal" or "Runtastic"), and in the subdirectory, an encrypted file or cookie may be stored which includes at least the user's service credentials, if not also additional information identifying the first online user, first client device, access application/portal/platform, and/or accessed network service. However, in selected embodiments, only the service credentials are stored so as to be browser and device neutral.

With the service credentials stored at the home network router 310, an online user from another device, platform, or portal at the home network may initiate access to the network service 320 at step 306. For example, the first online user may connect a second client device 300 (e.g., a tablet) to the home network router 310 from different platform/portal (e.g., Mozilla Firefox) at the second client device 300 by sending an access request to the home network router 310. Alternatively, a second, different online user may connect a third client device 300 (e.g., a smart phone) to the home network router 310 from different platform/portal (e.g., Android OS) at the third client device 300 by sending an access request to the home network router 310.

At step 316, the access request is processed by the home network router 310 to determine whether the home network router 310 has credentials for the requested network service. For example, the directory structure in a persistent credential store may be searched to locate a subdirectory corresponding to the requested network service. The credential search functionality may be embodied in the home network router 310 as software or firmware, such as DD-WRT, with an integrated custom service that is configured to check the stored credentials for the requesting online user whenever the network service is re-accessed from the home network to avoid requiring credential reentry.

If the service credentials are stored at the home network router 310 (affirmative outcome to step 316), the home network router 310 uses the stored credentials at step 317 to authenticate the access request from the second device/platform/portal and automatically log the user into the network service at step 326 without requiring re-entry of the credentials from the online user 300. Though not shown, the processing at step 317 may also include the generation of a message prompt to the online user to choose between entities or user identities recognized by the home network router 310 to address scenarios where there are multiple users from the home network accessing the same network service.

On the other hand, if the service credentials are not stored at the home network router 310 (negative outcome to step 316), the second client device 300 is prompted at step 308 to register, log in, or otherwise submit credentials to authenticate the online user. At step 318, the home network router 310 forwards the credentials to the network service 320 for authentication at step 328, and may also present a message prompt to the second client device 300 to ask if the online user would like to store credentials in the home network router 310.

As will be appreciated, the credential search and processing functionality of steps 316-318 may be embodied in the home network router 310 as software or firmware, such as DD-WRT, with an integrated custom service that is configured to check memory for stored credentials and use any located credentials to automatically authenticate the requesting online user directly with the network service when re-accessing the network access from the home network to avoid requiring credential reentry. In addition, the credential search and processing functionality may be embodied in router software or firmware which is configured to one or more enhanced administration features. For example, access to a specified network service by one or more specified home network users may be selectively enabled or disabled to control home network access. In a similar fashion, access to a specified network service by one or more specified browsers, application, or devices may be selectively enabled or disabled to control home network access.

With the disclosed system, method, and apparatus for storing service credentials on the home router upon approval by a user at a first device, other devices, portals, and applications on the home network can use the stored credentials to seamlessly access the service. For example, in a household with two Windows laptops, an iMac, an iPhone, and an Android tablet, access to a network service for fitness tracking (e.g., www.runtastic.com) may be synchronized among the devices, portals, and users on the home network by storing service credentials at the home router once a user on a first device (e.g., the iPhone) is authenticated for a service and activates the credential storage feature. During subsequent accesses from another device/portal/application to the fitness tracking service, the stored credentials at the home router may be used to authenticate any iPhone application, Android application, and websites on both Safari (iMac) and Chrome on the two Windows laptops, thereby solving the problem of synchronizing user actions across a variety of access points for the same service. For example, multiple household users using the fitness tracking service on their phone to track run distances will have several different ways to interact with the information once their workout is complete. The data generated by the phone can calculate a run distance that is tied (authenticated) to the user's account, but in cases where a mobile application has a different functionality compared to the full website functionality provided to a desktop device. When the user returns home after the workout to interact with the workout data on their computer, the requirement for recalling and re-entering their credentials again is eliminated by having the credentials stored on the home router. This home network credential storage feature is especially advantageous in a multi-device, multi-platform, multi-user environment where credential logins would otherwise be required for each access device, platform, and portal used to interact with the service. By storing or, caching application/website/service credentials at a router for sharing by different devices which use the router to access a network service, there is no need to manage heavy weight session data resources at the client devices or web service devices or to otherwise store credentials in a distributed manner across multiple client or server devices.

By now, it will be appreciated that there is disclosed herein a system, method, apparatus, and computer program product for sharing access to a network service by multiple devices in a home network with an information handling system having a processor and a memory. As disclosed, the system, method, apparatus, and computer program product may be implemented in an information handling system embodied as a home gateway router which receives a first user request from a first client device to access a network service, along with one or more user credentials from the first client device for authenticating access to the network service. Examples of user credentials include, but are not limited to, user identification and login information for the network service. Upon validation of the user credentials by the network service, the system associates the user credentials with the network service and stores the user credentials from the first client device in memory. Before storing user credentials at the home gateway router, the first user at the first client device may be prompted to enter a credential store access passphrase. In addition, the system may prompt the first user at the first client device with a message requesting permission to store the one or more credentials at the home gateway router. In selected embodiments, the user credentials are encrypted into an encrypted file and stored as an encrypted file in a subdirectory of the memory associated with the network service, while in other embodiments, the user credentials are stored as a cookie in a subdirectory of the memory associated with the network service. With the user credentials stored at the information handling system, a second user request from a second client device to access the network service is received and processed at the system by retrieving from memory the user credentials for direct delivery to and authentication by the network service without requiring re-entry of the one or more user credentials from the second client device. Thus, the stored user credentials are used to share access between a first user request from the first client device is generated by a first portal and application on the first client device, and a second user request from the second client device is generated by a second, different portal and application on the second client device.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a home gateway router, a processor and a memory, for sharing access to a network service by multiple devices in a home network, the method comprising:
   receiving, by the system, a first user request from a first client device to access a network service, wherein the first user request from the first client device is generated by a first portal and application on the first client device;
   receiving, by the system, one or more user credentials from the first client device for authenticating access to the network service;
   associating, by the system, the one or more user credentials with the network service;
   prompting the first user at the first client device to enter a credential store access passphrase before storing the one or more user credentials at the home gateway router;
   storing, in the memory of the system, the one or more user credentials from the first client device;
   receiving, by the system, a second user request from a second client device to access the network service, wherein the second user request from the second client device is generated by a second, different portal and application on the second client device; and
   retrieving, from the memory of the system, the one or more user credentials for direct delivery to and authentication by the network service without requiring re-entry of the one or more user credentials from the second client device.

2. The method of claim 1, further comprising prompting the first user at the first client device with a message requesting permission to store the one or more user credentials at the home gateway router.

3. The method of claim 1, where receiving one or more user credentials comprises receiving user identification and login information for the network service.

4. The method of claim 1, where storing the one or more user credentials comprises encrypting the one or more user credentials into an encrypted file and storing the encrypted file in a subdirectory of the memory associated with the network service.

5. The method of claim 1, where storing the one or more user credentials comprises storing the one or more user credentials as a cookie in a subdirectory of the memory associated with the network service.

6. An information handling system comprising:
one or more microprocessors;
a memory coupled to at least one of the microprocessors,
a home gateway router;
a set of instructions stored in the memory and executed by at least one of the processors to facilitate shared access to a network service, wherein the set of instructions are executable to perform actions of:
receiving, by the system, a first user request from a first client device to access a network service, wherein the first user request from the first client device is generated by a first portal and application on the first client device;
receiving, by the system, one or more user credentials from the first client device for authenticating access to the network service;
associating, by the system, the one or more user credentials with the network service;
prompting the first user at the first client device to enter a credential store access passphrase before storing the one or more user credentials at the home gateway router;
storing, in the memory of the system, the one or more user credentials from the first client device;
receiving, by the system, a second user request from a second client device to access the network service, wherein the second user request from the second client device is generated by a second, different portal and application on the second client device; and
retrieving, from the memory of the system, the one or more user credentials for direct delivery to and authentication by the network service without requiring re-entry of the one or more user credentials from the second client device.

7. The information handling system of claim 6, further comprising an additional set of instructions stored in the memory and executed by at least one of the processors to perform action of prompting the first user at the first client device with a message requesting permission to store the one or more user credentials at the home gateway router.

8. The information handling system of claim 6, where receiving one or more user credentials comprises receiving user identification and login information for the network service.

9. The information handling system of claim 6, where storing the one or more user credentials comprises storing the one or more user credentials as a cookie in a subdirectory of the memory associated with the network service or encrypting the one or more user credentials into an encrypted file and storing the encrypted file in a subdirectory of the memory associated with the network service.

10. A computer program product stored in a non-transitory computer readable storage medium, comprising computer instructions that, when executed by an information handling system comprising a home gateway router, causes the system to facilitate shared access to a network service by performing actions comprising:
receiving, by the system, a first user request from a first client device to access a network service, wherein the first user request from the first client device is generated by a first portal and application on the first client device;
receiving, by the system, one or more user credentials from the first client device for authenticating access to the network service;
associating, by the system, the one or more user credentials with the network service;
prompting the first user at the first client device to enter a credential store access phrase before storing the one or more user credentials at the home gateway router;
storing, in the memory of the system, the one or more user credentials from the first client device;
receiving, by the system, a second user request from a second client device to access the network service, wherein the second user request from the second client device is generated by a second, different portal and application on the second client device; and
retrieving, from the memory of the system, the one or more user credentials for direct delivery to and authentication by the network service without requiring re-entry of the one or more user credentials from the second client device.

11. The computer program product of claim 10, further comprising instructions that are executed to cause the system to prompt the first user at the first client device with a message requesting permission to store the one or more user credentials at the home gateway router.

12. The computer program product of claim 10, where storing the one or more user credentials comprises storing the one or more user credentials as a cookie in a subdirectory of the memory associated with the network service or encrypting the one or more user credentials into an encrypted file and storing the encrypted file in a subdirectory of the memory associated with the network service.

* * * * *